United States Patent [19]

Bradbury

[11] Patent Number: 4,476,974
[45] Date of Patent: Oct. 16, 1984

[54] CONTINUOUS ARTICLE HANDLING CONVEYOR

[75] Inventor: Bernard G. Bradbury, Chico, Calif.

[73] Assignee: Rexnord Inc., Brookfield, Wis.

[21] Appl. No.: 313,005

[22] Filed: Oct. 19, 1981

[51] Int. Cl.³ .............................................. B65G 23/00
[52] U.S. Cl. .................................. 198/832; 198/840; 198/851
[58] Field of Search ............... 198/321, 851, 853, 832, 198/475, 840

[56] References Cited

U.S. PATENT DOCUMENTS

| | | | |
|---|---|---|---|
| 3,395,648 | 8/1968 | Karr et al. | 198/321 |
| 3,493,097 | 2/1970 | Karr | 198/321 |
| 3,718,249 | 2/1973 | Hess | 198/832 |

Primary Examiner—Joseph E. Valenza
Assistant Examiner—Jonathan D. Holmes

[57] ABSTRACT

An endless path conveyor of the type used for luggage handling, having crescent shaped pallets connected one to the next through pivotal connecting pins by offset link arms. The pivotal connecting pins have a cam follower which engages a helical groove in a drive screw located beneath the conveying surface. The cam follower is maintained in secure contact with the driving groove of the helical screw by limiting cam rollers, eliminating sideways movements of the pallets during engagement or disengagement of the cam follower with the helical screw drive. The driving groove has enlarged portions at either end to eliminate bumping motion of the conveyor links. The axis of the conveyor and of the links are offset from one another to minimize the gap formed when travelling through curved sections, allowing the maximum amount of conveying surface possible. Bearing and guide means are provided for a smoother, quiet drive, and to prevent tilting or inward collapse of the pallet links under heavy load.

5 Claims, 9 Drawing Figures

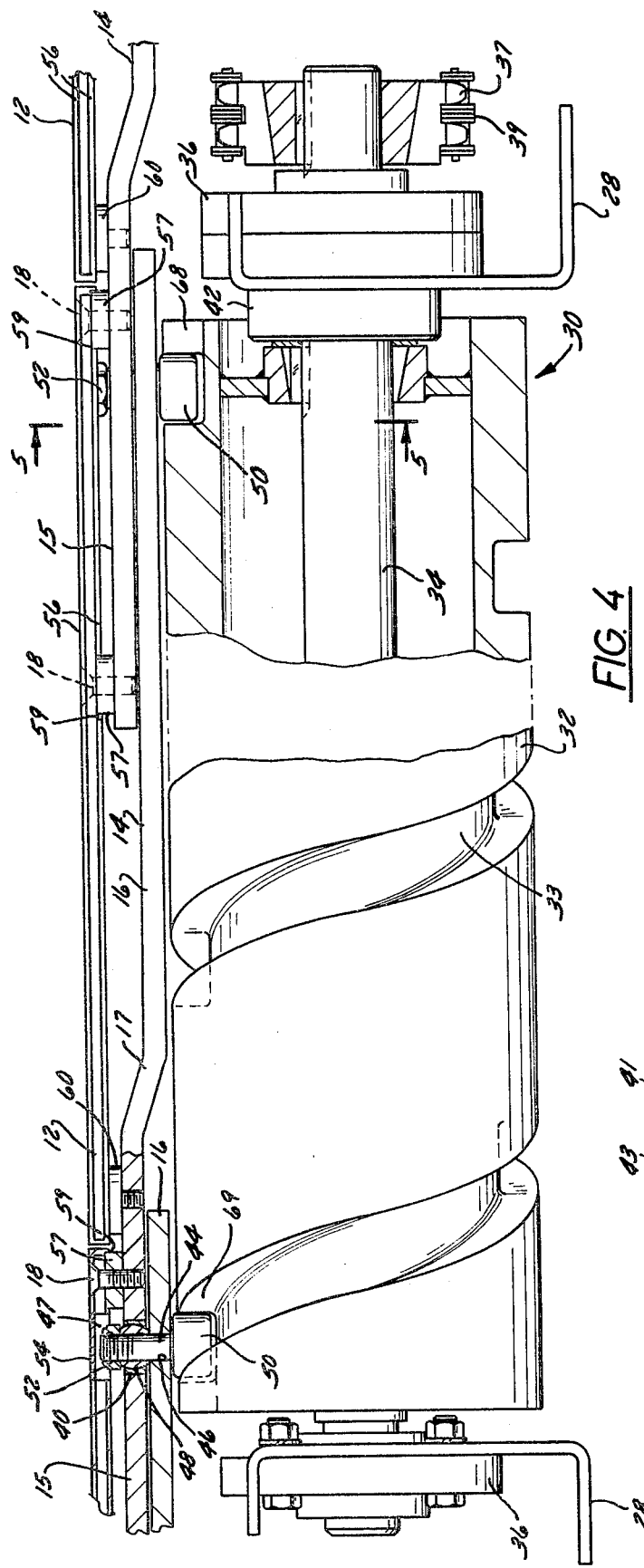
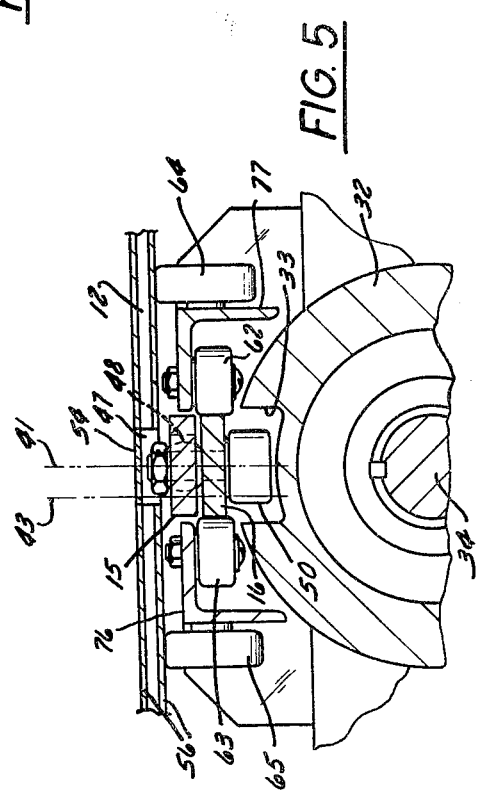
FIG. 4
FIG. 5

CONTINUOUS ARTICLE HANDLING CONVEYOR

TECHNICAL FIELD

This invention relates to moving platforms and, more particularly, to an improved endless chain of generally horizontally disposed pallets on which baggage or the like is conveyed.

BACKGROUND ART

It is known in the prior art to transport luggage or other parcels by means of an endless conveyor. In such conveyors, typically used for the delivery of baggage in plane, train, and ship terminals, the baggage is either deposited on the conveyor and is carried to some other location or is transferred from one conveyor to an inclined conveyor and is carried around the inclined conveyor where the passengers may claim it. These conveyors have used various methods for propulsion. One such method includes endless drive chains with pusher dogs attached thereto and adapted to engage a follower or the like secured to pallets. Such drives are generally known as "caterpillar" drives. The disadvantages of such a caterpillar drive system includes relying on a line contact transmitting a tremendous amount of force. Since the pusher dog has to come up from behind the follower and engage the follower surface, there is a tendency for the pallet to be lifted if the pusher dog contacts the follower prematurely. Likewise, if a force still exists as the pusher dog leaves the follower then there is a tendency for the pusherdog to try and drag the pallet down. Therefore, a pallet will act like a spring board.

Another weakness with this system is that it is not practical to have the contact faces on the follower at exactly the same center to center distance as the pusher dogs on the drive chain without relieving the contact face at an angle to enable the pusher dog to come up behind the contact face. If, however, the pusher dog contacts this angled face, a tendency to lift the pallet exists.

Still another type of drive means used with moving conveyor systems consists of endless flat drive belts. The disadvantages of the flat belt drive is that a long length of belt is required to utilize the weight of the pallet to create enough friction to drive the conveyor.

The improvement of the present invention is used in order to insure as simple, smooth and quiet conveyor operation as possible with the maximum, effective load handling surface for a given transverse conveyor width.

SUMMARY OF THE INVENTION

The present invention is directed to an improved conveyor for handling luggage or the like which attempts to solve the problems of prior luggage handling conveyors.

In a preferred embodiment, a baggage handling conveyor is provided wherein a plurality of cresent shaped, generally horizontal, pallet assemblies disposed on link members, joined in general abutment by self-aligning bearings, form an endless chain. The endless chain is rotatably supported on rollers and guided by a guide means. The conveyor may either be circular in plan, or non-circular, such as "T"-shaped or "E"-shaped or the like. The endless chain is driven by an offset barrel screw means disposed below the links and engaging a cam roller which is downwardly displaced from said links.

The barrel screw drive means has a helical groove about its outer surface for contacting the cam roller so that the endless chain assembly moves along the closed path. Further, the helical groove, on the cam roller bearing surface, has a lead-in and lead-out at opposite ends of said drive means, which provides more latitude on the spacing of the guide cam rollers in the pallet chain so that a bump will not occur when the next cam roll enters the groove before the preceding cam roll exits the groove.

The barrel screw drive is also provided with longitudinally disposed guide rollers on both sides of the cam roller path through the helical groove, to accept the side thrust imposed on the main cam roll by the barrel screw. Additional support wheels are also positioned on either side of the center line through the drive, so that concentrated weight in the center of the pallet will not push the pallet down and cause the cam roll to bottom out in the barrel screw groove.

The link members have a bearing pad means disposed on the top surface thereof, which supports the front edge of the following pallet to reduce the amount of friction between pallets when the pallets enter or exit a curve.

It is an object of this invention to provide a material handling conveyor that has a net increase of usable power or increased capacity in terms of overall length and width and, or live load without the need to trap the pallet chain between upper rollers so that they will not lift-up in the drive area.

Further it is an object of this invention to provide a smooth, quiet drive with less wearing parts and reduced maintenance.

The various features of novelty which characterize this invention are pointed out with particularly in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

FIG. 4 is a fragmentary side elevation of the drive mechanism of the conveyor taken along the line 4—4 of FIG. 3.

FIG. 5 is a fragmentary cross section of the drive mechanism of the conveyor taken along the line 5—5 of FIG. 4.

DESCRIPTION OF THE PREFERRED EMBODIMENT

Figure 1:
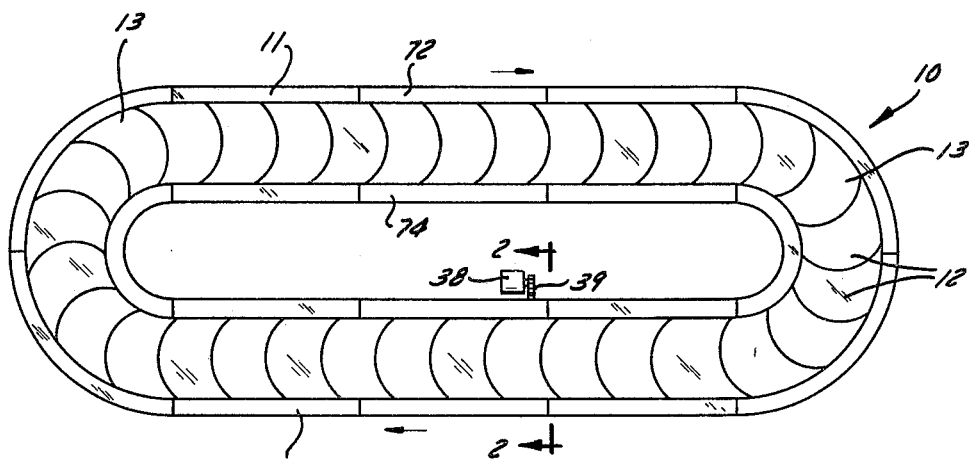
FIG. 1 is a top plan view of a conveyor made in accordance with the invention.

FIG. 1 illustrates a conveyor 10 used to move material along an endless path in the direction of the arrows. The conveyor 10 consists of a plurality of pallets 12 connected one to the next. Neither the length nor the configuration of the particular conveyor are important, but are generally sufficient for handling luggage at airports, where the luggage is carried around the closed path for removal by people standing adjacent the outer perimeter of the conveyor. The conveyor 10 is constructed from straight sections 11 and curved sections 13, which are generally the same length. However, the sections 11, 13 may vary in length so that the conveyor may have many shapes, such as, oval, square, "keyhole", or the like.

Figure 6:
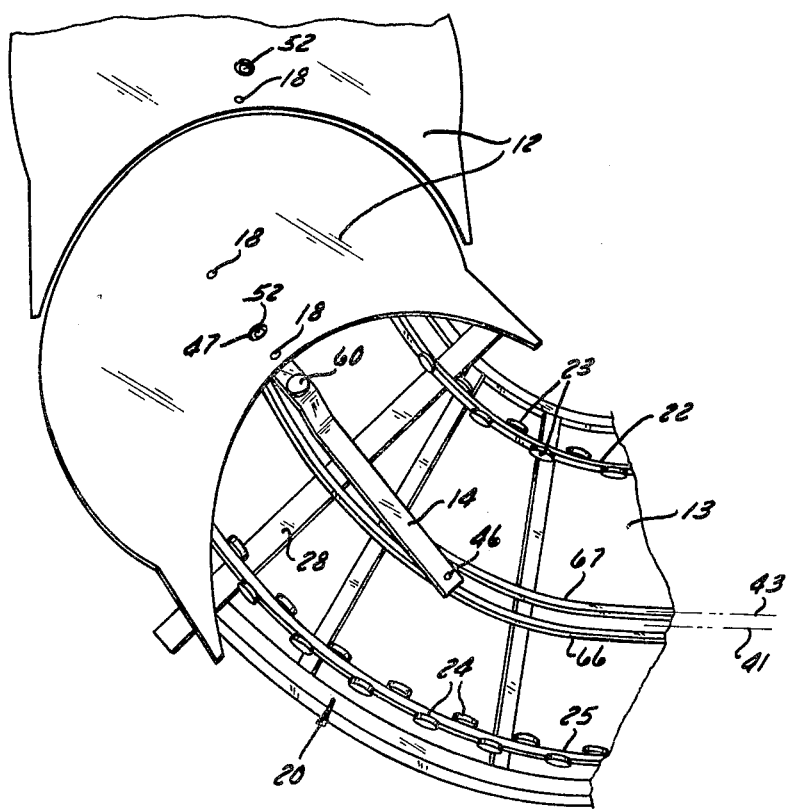
FIG. 6 is a perspective view of a portion of the conveyor with parts removed for clearness of illustration.
Figure 3:
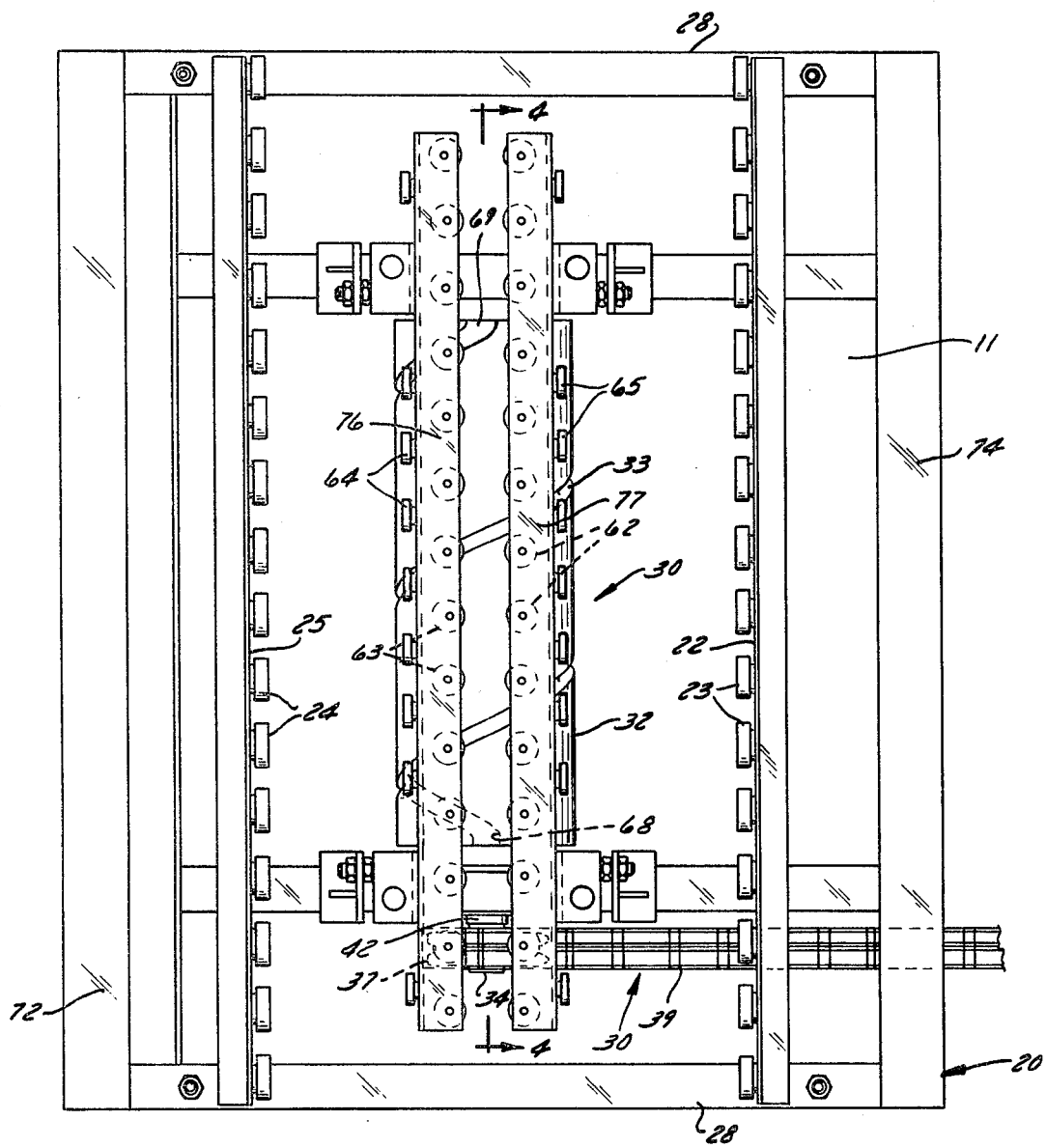
FIG. 3 is a fragmentary top plan view of the drive mechanism of the conveyor with the pallets removed.
Figure 2:
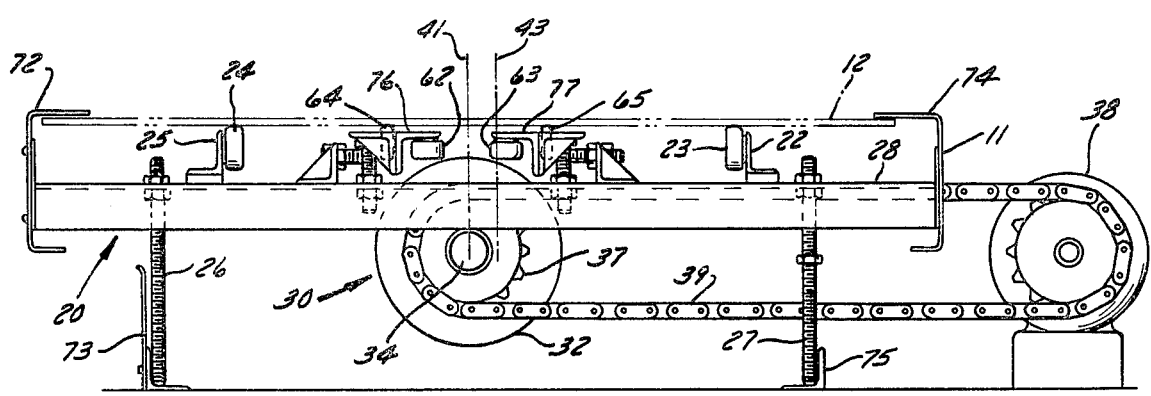
FIG. 2 is a vertical transverse sectional view of the conveyor taken along the line 2—2 of FIG. 1 with parts removed for clearness of illustration.

The pallets 12, as illustrated in FIGS. 2 and 6, are supported on a frame 20 by pairs of rotatably supported rollers 23 and 24. The rollers 23, 24 are arranged on a pair of support members 22, 25 which are spaced apart an appropriate distance and follow a path of the endless conveyor 10. The rollers 23, 24 may be alternately disposed on opposite sides of their respective support members 22, 25 as illustrated in FIG. 6. However, a drive means 30 as illustrated in FIGS. 2, 3 and 4, is generally carried in a straight section 11 which has rollers 23, 24 disposed in generally single rows on frame 20. The frame 20 includes spaced longitudinal support members 26, 27 having crossbraces 28 thereon. The frame 20 further includes pairs of frame plates 72, 74 and 73, 75 which protect people and material from the moving conveyor and help guide the pallets along their path. The upper frame plates 72, 74 project inwardly particularly adjacent the pallets 12, to ensure a minimum gap between the frame plates 72, 74 and the moving pallets 12. Further, the center-line of the pallet 41 is offset from the center-line of the conveyor 43 as described herein.

The described support frame 20 further supports the drive means 30 as illustrated in FIGS. 2 and 3. The drive means in the preferred embodiment, also in FIG. 4, consists of an elongated barrel screw 32 which is rotatably supported by a shaft 34, which in turn is supported by two radial bearings 36, and a motor means 38 which drives the shaft 34 by way of a chain 39 and a sprocket 37. The end thrust created by the resistance to a load moving through the barrel screw is taken up by a self-aligned thrust bearing 42.

Figure 7:
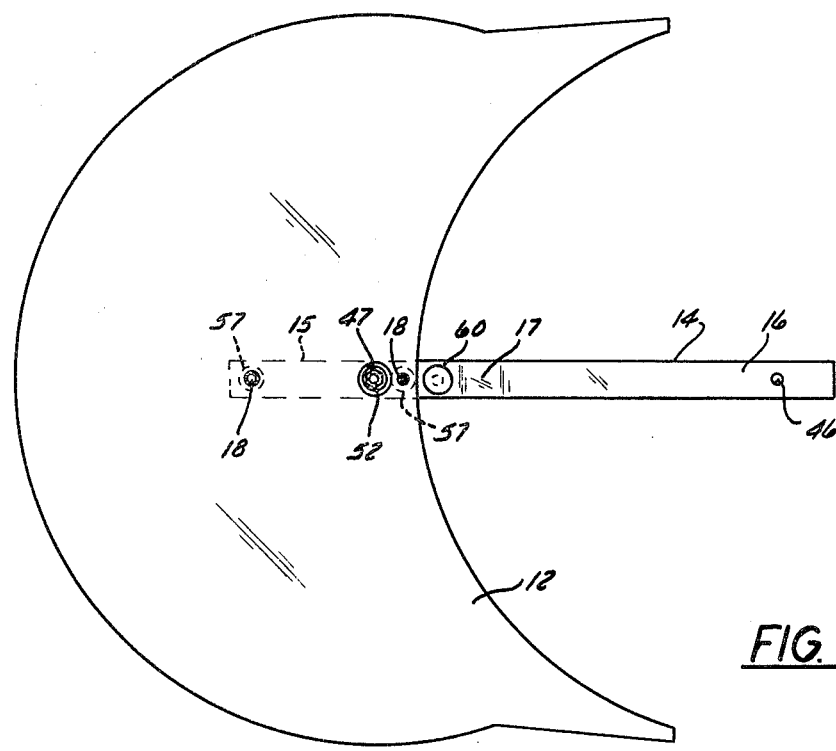
FIG. 7 is a top plan view of a pallet assembly of the conveyor made in accordance with the invention.
Figure 8:
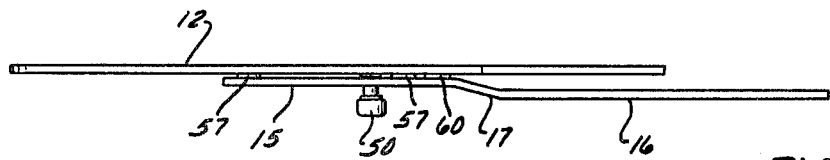
FIG. 8 is a side elevation of the pallet assembly of FIG. 7.
Figure 9:
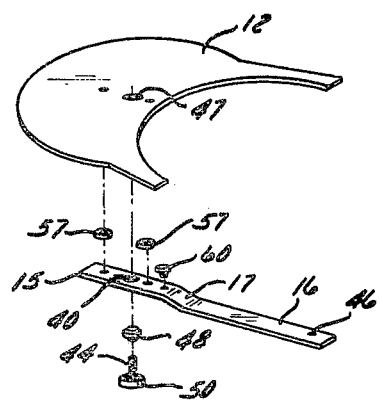
FIG. 9 is an exploded perspective view of the pallet assembly of FIG. 7.

Each pallet 12, as illustrated in FIGS. 7, 8 and 9, forms one link of an endless chain of pallets, and is made up of crescent shaped members, which are preferably steel pallets generally encapsulated with polyurethane 56, as shown in FIGS. 4 and 5. The pallets 12 are connected one to the next by link arms 14. The link arms 14 are generally bar like members having a leading portion 15 and a trailing portion 16 connected by a downwardly projecting offset portion 17. The polyurethane 56 is removed from the pallet to form a recess 59 on the underside of the pallet to maintain metal to metal contact with spacers 57, which stand the pallet 12 off from the link arm 14.

As illustrated more clearly in FIG. 4, the pallet 12 is secured to the leading portion 15 of the link arm generally by two flat head screws 18. Moreover, leading portion 15 of a link arm 14 is connected through aperture 40 by a connecting pin 44 to the trailing portion 16 of the preceding link arm 14 through aperture 46. The lower end of the connecting pin 44 has a cam roller 50 attached thereto. The cam roll 50 acts as a guide roll to guide the pallet chain around the path of travel. The cam roll 50 is guided by vertical plates 66, 67 in the non-drive sections of the conveyor as shown in FIG. 6, and by rollers 62, 63, which guide cam roll 50 through the drive means section of the conveyor as shown in FIGS. 3 and 5. Further, the cam roll 50 is the member through which the motive force is transmitted from the barrel screw 32 to the conveyor 10.

Each connecting pin 44 has a self-aligning bearing 48 circumscribing a portion thereof which is generally adapted to lie within the aperture 40 in the leading portion 15 of the link arm 14. The bearing 48 aligns one link with a preceding link and gives the pallets 12 a little flexibility in the horizontal plane, so that the components of the support members 22, 25 do not have to be perfectly flat and true. Once two links of a chain have been connected together by the connecting pin 44 a self-locking nut 52 is attached thereto to hold the connecting pin 44 in position. Accordingly, the attached connecting pin 44 with the cam roll 50 held rigidly at the end keep the bending moments on the cam roll 50 to a minimum. After assembly the connecting pin 44 can be conveniently lubricated by removing plug 54 from the hole 47 in the pallet 12 which is vertically aligned with the connecting pin 44.

A bearing pad 60 is secured to the top surface of each of the leading portions 15 of the link arms 14 for engagement with the lower surface of the front edge of the following pallet 12 to reduce the amount of friction which generally occurs when the pallets 12 enter or exit a curve in the path of the conveyor.

As illustrated in FIG. 4, the barrel screw 32 of drive means 30 has a helical groove 33 about the outer surface of said barrel screw 32. The helical groove 33 meshes with the cam roll 50 so that the endless chain assembly moves along the closed path of the conveyor. As the cam roll 50 moves through the helical groove 33 of the barrel screw 32 it is guided on both sides by rollers 62 and 63 (FIG. 5). The rollers 62 and 63 are attached to longitudinally disposed angle member 76, 77 and accept the side thrust imposed on the cam roller 50 by the barrel screw 32. The guide path means formed from parallel, vertical plates 66, 67 extending longitudinally around the closed path of the conveyor guides the cam roll 50 along its path outside the drive means 30. Further, support wheel 64, 65 are positioned on either side of the longitudinal axis through the drive means 30 so that concentrated weight of the center of the pallets 12 will not push said pallets down and cause the cam roll 50 to bottom out on the barrel screw 32. Still further, the barrel screw 32 has widened helical grooves at the end portions, i.e. lead-in 68 and lead-out 69, respectively, which are tapered faces on the helical groove 32 on which the cam roll 50 bears. The lead-in 68 and lead-out 69 taper the bearing face for more than 10 degrees of rotation of the barrel screw 32. The lead-in 68 and lead-out 69 provides more latitude on the spacing of the cam rolls 50 in the endless chain so that a bump or knock will not occur when the next cam roll 50 enters the helical groove 33 before the preceding cam roll 50 exits said groove.

As shown in FIGS. 2, 5, and 6, the center line of the pallet 41 is offset from the center line of the conveyor 43. The center line of the pallet 41 is generally offset toward the larger radius of curvature of the conveyor. Accordingly, in an oval shaped conveyor the pallets 12 extend further under the frame plate 72 than the frame plate 74, so that as the pallets 12 move around a curve the gap that opens up between a first pallet and an attached subsequent pallet will remain under the frame plate 72. The offset of the center line of the pallet 41, thus, provides the maximum effective load handling surface for a given conveyor width. On multiple curved conveyors, such as "T"-shaped, or "E"-shaped, and the like, the center line of the pallet 41 is still offset from the center line of the conveyor 43 toward the larger radius of the conveyor. Thus, unlike simple oval shapes, the center line of the pallet 41 may be inside the center line of the conveyor, since the two center lines may cross as the center of the radius of curvature changes from inside the conveyor to outside the conveyor.

While the invention has been described with respect to a preferred embodiment, it will be understood that many modifications may be contemplated within the scope of the claims.

I claim:

1. A conveyor, comprising:
    a. a supporting structure defining a closed planar path;
    b. an endless chain assembly adapted to move around said closed path, including:
        i. a plurality of links each having a leading section parallel to the plane of said closed planar path, a trailing section parallel to the plane of said closed planar path, and a downwardly sloping section connecting said leading section with said trailing section, and an aperture extending through each leading and trailing section perpendicular to said closed planar path;
        ii. a plurality of pallets, each fixedly attached to the top of said leading section of its respective link;
        iii. a plurality of connecting pins pivotally connecting said leading sections of said links to the trailing sections of a preceding link through said respective apertures therein; each of said pins having a self-aligning bearing means circumscribing a portion thereof and lying within one of said apertures in said links for aligning one link with a preceding link, and a cam roller means fixedly attached to the other end of said pin for transmitting motive force to said endless chain assembly;
    c. a cylindrical drive means disposed underneath said endless chain assembly and having a helical groove about its outer surface adapted to engage said cam roller means to provide motive force thereto such that said endless chain assembly will be moved along said closed planar path, said helical groove including widened, tapered ends so as to ensure a smooth lead-in and lead-out of said cam roller as it enters and leaves said helical groove; and
    d. a guide means secured to said supporting structure in the area of said drive means and adapted to accept the side thrust imposed on said cam roller means by said cylindrical drive means.

2. A conveyor as recited in claim 1, wherein said guide means comprises a plurality of guide wheels mounted on said supporting structure so as to rotate about an axis which is perpendicular to the plane of said closed planar path, such that said guide wheels contact at least one of the links on which said cam roller is mounted when said cam roller is engaged in said helical groove.

3. A conveyor as described in claim 2 further comprising a bearing pad member disposed on the top surface of each of said leading sections of said links for engagement with the lower surface of the subsequent pallet to reduce the friction therebetween.

4. A conveyor as recited in claim 3, wherein said supporting structure has a longitudinal axis which defines the centerline of the conveyor, and wherein said cylindrical drive means has an axis of rotation which is generally offset from said longitudinal axis, and including a pair of plate means secured to said supporting structure around the conveyor and extending generally equally inwardly toward said centerline of the conveyor slightly above the outer edge of said pallets forming a gap between said plate means and said pallets, whereby, due to the offset of said drive means and the corresponding offset of said pallets, a larger portion of said outer edges of said pallets is covered by the plate means along the outer length of a straight section of the conveyor.

5. A conveyor as recited in claim 4, wherein said widened, tapered ends of said helical groove are disposed through an angle of rotation of greater than ten degrees about the axis of rotation of said cylindrical drive means.

* * * * *